United States Patent
Manning et al.

(10) Patent No.: US 9,557,221 B1
(45) Date of Patent: Jan. 31, 2017

(54) INTERFEROMETER FOR FOURIER TRANSFORM INFRARED SPECTROMETRY

(71) Applicant: Mettler-Toledo Autochem, Inc., Columbia, MD (US)

(72) Inventors: Christopher Manning, Columbia, MD (US); Peter Alfred Blacklin, Columbia, MD (US); Nilesh Shah, Columbia, MD (US)

(73) Assignee: METTLER-TOLEDO AUTOCHEM, INC., Columbia, MD (US)

( * ) Notice: Subject to any disclaimer, the term of this patent is extended or adjusted under 35 U.S.C. 154(b) by 0 days.

(21) Appl. No.: 15/191,933

(22) Filed: Jun. 24, 2016

(51) Int. Cl.
| G01J 5/02 | (2006.01) |
| G01J 3/453 | (2006.01) |
| G01J 3/02 | (2006.01) |
| G01J 9/02 | (2006.01) |

(52) U.S. Cl.
CPC ............ *G01J 3/4535* (2013.01); *G01J 3/453* (2013.01); *G01J 3/0202* (2013.01); *G01J 9/0215* (2013.01)

(58) Field of Classification Search
CPC ............ G01J 3/45; G01J 3/453; G01J 3/0205; G01J 3/26
See application file for complete search history.

(56) References Cited

U.S. PATENT DOCUMENTS

| 3,482,919 A | 12/1969 | Barringer |
| 4,537,508 A * | 8/1985 | Doyle ................ G01J 3/453 |
| | | 356/452 |
| 4,654,530 A | 3/1987 | Dybwad |
| 5,066,990 A | 11/1991 | Rippel |
| 5,486,917 A | 1/1996 | Carangelo et al. |
| 5,675,415 A | 10/1997 | Akatsu et al. |
| 5,949,543 A | 9/1999 | Bleier et al. |
| 6,229,614 B1 | 5/2001 | Larsen |
| 6,233,054 B1 * | 5/2001 | Theriault .............. G01J 3/45 |
| | | 356/451 |
| 7,224,464 B2 | 5/2007 | Manning |
| 7,480,055 B2 | 1/2009 | Buijs et al. |
| 2007/0170232 A1* | 7/2007 | Spivey ............. B65D 5/4608 |
| | | 229/117.16 |

OTHER PUBLICATIONS

Griffiths, P.R. et al., Fourier Transform Infrared Spectrometry, 1986, pp. v-xi, pp. 1-15, pp. 80-93, pp. 120-127, John Wiley & Sons, Inc., USA.

* cited by examiner

*Primary Examiner* — David J Makiya
*Assistant Examiner* — Kenneth J Malkowski
(74) *Attorney, Agent, or Firm* — Standley Law Group LLP

(57) ABSTRACT

An interferometer wherein an incident beam from a radiation source hits a beam splitter at a first oblique angle of incidence and is split into a first, reflected partial beam, and a second, transmitted partial beam, that subsequently travel along separate arms of the interferometer. The first and second partial beams are respectively intercepted, reflected, and re-split to form returning beam portions and reflected and transmitted exit beam portions. A second terminal mirror and a folding mirror, which intercepts the second partial beam at a second oblique angle of incidence, are associated with the second interferometer arm and positioned orthogonal to the reference plane and on opposite sides of the exit path, so that a section of the second partial beam from the folding mirror to the terminal mirror and back to the folding mirror crosses the exit beam twice.

18 Claims, 4 Drawing Sheets

INTERFEROMETER FOR FOURIER TRANSFORM INFRARED SPECTROMETRY

BACKGROUND AND SUMMARY

The invention concerns interferometers for Fourier transform infrared (FT-IR) spectrometry, commonly referred to as FT-IR spectrometers. In the practice of FT-IR spectrometry, infrared radiation usually is brought into interaction with a sample, while the spectrum of the radiation, i.e. the intensity as a function of wavelength, is determined by using an interferometer to modulate each wavelength with a unique coding, then analysing the resulting signal by Fourier transformation. As the transmission and absorption of specific wavelengths of light are characteristic of molecular structure, number density and physicochemical environment, FT-IR spectroscopy can be used, for example, to identify unknown materials, to determine the purity or consistency of a sample, or to determine the components in a mixture as well as their respective proportions.

One core element of almost all FT-IR spectrometers is a two-beam interferometer of the general type invented by Albert A. Michelson in the late 19th century. The other core element is a computing engine. In a Michelson interferometer adapted for FT-IR spectrometry, a nominally collimated beam of light from a broadband polychromatic source, usually a black-body radiator, is split by a partial reflector, known as a beam splitter, into two partial beams, each of which ideally contains 50% of the original light. A first partial beam reflected by the beam splitter travels along a first path, which branches off at an angle from the original collimated beam to a first, movable, mirror arrangement and back to the beam splitter. A second partial beam transmitted by the beam splitter travels along a second arm that continues in the direction of the original collimated beam to a second, fixed mirror and back to the beam splitter. Upon return to the beam splitter, the first and second partial beams are recombined and thereby caused to optically interfere with each other. The two returning beams are again split at the beam splitter to form two new beams. One of the recombined beams returns to the source and the other is passed to a sampling interface. Ideally, 50% of the original light reaches the sample interface, while the other 50% of the original light is returned to the source. After transmission through the sample, or reflection from the sample, or other interaction in the sampling interface, the remaining light is focused on an electro-optical sensor device, usually called infrared detector, which produces an electrical signal representative of the light intensity or energy in the recombined beam. Due to the interference between the two partial beams upon recombination, this light intensity varies as a function of the path difference $\delta$ (commonly referred to as retardation $\delta$) between the variable path length of the first arm and the fixed path length of the second arm and also in response to changes in the sample. By varying the retardation $\delta$ in a controlled translatory sweep (commonly referred to as a scan) of the movable mirror through a defined range and recording the resultant light intensity I detected by the electro-optical sensor, an interferogram $I(\delta)$ is obtained. The general practice of FT-IR spectrometry has been well understood for fifty years and has been the subject of numerous textbooks such as for example P. R. Griffiths and J. A. de Haseth, *Fourier Transform Infrared Spectrometry*, (New York: John Wiley and Sons, 1986). The feature that one mirror or both can be moved to perform a scan and thereby generate an interferogram $I(\delta)$ represents an adaptation of the basic Michelson interferometer, which is in this case referred to as a scanning Michelson interferometer. The interferogram that is generated when no sample is present (referred to as the background interferogram) depends primarily on the source spectrum and the variation of instrument efficiency with wavelength. The instrument background spectrum mainly relates to the beam splitter and detector efficiency functions, as well as the blackbody emission spectrum of the source. The interferogram $I(\delta)$ has a maximum at zero retardation ($\delta=0$) where all wavelengths of the first and the second partial beam recombine with nearly zero phase shift. When a sample is present, the background interferogram is modified by the loss of energy to absorption in the sample.

To be useful for spectrometry, the interferogram $I(\delta)$ must be converted to a spectrum $B(\tilde{v})$, i.e. intensity as a function of frequency. The frequency unit commonly used in FT-IR spectrometry is wavenumber $\tilde{v}$, or spatial frequency of the light wave, which can be expressed either as $\tilde{v}=1/\lambda$ in cycles per unit distance or as $\tilde{v}=2\pi/\lambda$ in radians per unit distance and usually given in cgs units of $[cm^{-1}]$.

As described for example in the aforementioned textbook *Fourier Transform Infrared Spectrometry* by P. R. Griffiths and J. A. de Haseth, the relationship between an interferogram $I(\delta)$ and the associated spectrum $B(\tilde{v})$ can be represented as a Fourier transform pair $$I(\delta) = \int_{-\infty}^{+\infty} B(\tilde{v})\cos 2\pi\tilde{v}\delta\, d\tilde{v}$$

$$B(\tilde{v}) = \int_{-\infty}^{+\infty} I(\delta)\cos 2\pi\tilde{v}\delta\, d\delta$$

with the idealizing assumption that the respective ranges of integration for $I(\delta)$ and $B(\tilde{v})$ both extend from minus to plus infinity. The fact that the output function $I(\delta)$ of a scanning interferometer represents the Fourier transform of the spectrum of IR radiation received by the sensor explains why a spectrometer of the kind described above, which is based on a scanning Michelson interferometer or related variation, is generally referred to as Fourier-transform infrared spectrometer.

In addition to the broadband polychromatic infrared source, the FT-IR spectrometer generally includes a laser having a sharply-defined monochromatic output. The laser beam, which follows a similar path through the interferometer parallel to the light of the broadband source and is received by a second light sensor, produces an interferogram in the form of evenly spaced interference fringes whose separation distance corresponds to the laser wavelength. The laser interferogram is used as an accurate length scale reference or wavelength calibration reference for the interferogram of the broadband infrared source. In addition, the laser serves to monitor the scanning velocity, which is controlled through a servo loop in which the frequency of the reference laser interference fringes is compared to a desired velocity value and the difference is applied as feedback to correct the velocity by adjusting the current in a voice coil that drives the moving mirror.

In practice, the integration limits for $I(\delta)$ and $B(\tilde{v})$ are not at plus and minus infinity but are given by the respective actual ranges of the retardation $\delta$ and wavenumber $\tilde{v}$, i.e. defined by the excursion range of the movable mirror and the applicable spectral range of light processed by the spectrometer apparatus. The actual conversion of the interferogram I(δ) to the associated spectrum B(ṽ) is performed by a computer through a numerical integration using the fast Fourier transform (FFT) technique as explained in the aforementioned reference P. R. Griffiths and J. A. de Haseth and countless others.

The overall range of infrared radiation covers wavelengths from the nominal red edge of the visible spectrum at 700 nanometers to about 1000 microns, or, expressed in terms of wavenumber units, between 14,000 $cm^{-1}$ and 10 $cm^{-1}$. An FT-IR spectrometer, or at least its optical components, which can be interchangeable, generally works over a specific part of the IR spectrum. Near-infrared spectroscopy generally uses the region of the electromagnetic spectrum from approximately 12,500 to 4000 $cm^{-1}$ (800 to 2500 nm). The range of mid-infrared spectroscopy is approximately 4000 to 400 $cm^{-1}$ (2.5 to 25 µm). Far-infrared spectroscopy covers the spectral region of 400 to 10 $cm^{-1}$ (25 µm to 1 mm), which borders on the microwave region of the electromagnetic spectrum.

A scanning interferometer may further include a compensator plate which is placed in the radiation path, normally downstream of the beam splitter and spaced from the latter with only a narrow gap. Compensator plates are well known in the art. Their function is to ensure that light traveling through either arm of the interferometer encounters the same thickness of refractive material and, more particularly, to equalize dispersion in the two arms, with the result of producing nearly symmetric interferograms that minimize phase errors as a source of photometric error.

While the principal concept can be demonstrated with an optical bench model, considerable inventive efforts have been invested since the 1950's and continue to be undertaken in the development of FT-IR spectrometers as commercial laboratory and process instruments. Besides performance factors such as measurement resolution and speed, important aspects are compactness, portability, tolerance to shock, vibration and temperature fluctuation. Solutions that have been proposed and realized include interferometer designs with folded light path geometries and compact supporting frame assemblies of massive or monolithic construction for mechanical and thermal stability. Instead of, or in addition to, using fixed and/or translatory movable planar mirrors, the state of the art includes scanner arrangements in which corner cube reflectors, roof reflectors, periscope mirror arrangements, or planar-parallel refractive optical plates perform swivel movements about rotary axes, or where the beam splitter is movable and thus simultaneously acts as scanner element. Flexure-pivoted mechanisms are used with preference to precisely guide the rotary movements of these optical elements, while avoiding vibration, stiction and wear associated with ball and roller bearings.

The importance of a stable construction to withstand shock, vibration and temperature change is recognized for example in U.S. Pat. No. 5,949,543. A box-like structure, which is referred to as a monolithic optical assembly, is described as a mounting base for the beam splitter and for a planar mirror as stationary reflector, whereby the beam splitter and the stationary reflector are held in stable alignment with each other. The light source and the movable mirror have mounting bases of their own which are arranged on a common support surface with the monolithic optical assembly. As an alternative to a planar movable mirror, a corner cube retro-reflector is proposed in one embodiment. The attribute "monolithic" does not seem to be justified, as the proposed arrangement of the box-like structure and the movable mirror or retro-reflector is not in fact monolithic.

Besides the movable corner cube retro-reflector in U.S. Pat. No. 5,949,543 as an alternative to the translatory planar movable mirror of the original scanning Michelson interferometer, the length of one of the two arms of the split light path can also be varied according to U.S. Pat. No. 3,482,919 through swivel rotations of a periscope-like arrangement of two mirrors mounted on a rotatable stage or through swivel rotations of a refractive scanning element, i.e. a planar-parallel refractive optical plate.

A rotatable planar-parallel refractive plate to produce optical path length variations is likewise shown in U.S. Pat. No. 4,654,530. After division by the beam splitter, the two partial beams proceed along first and second arms that are folded mirror-symmetrically relative to the central plane of a rotatable refractive plate, which is referred to as rotary refractive window. As the two arms of the split light path traverse the refractive window in opposite directions, the rotation of the window simultaneously causes a lengthening of one arm and a shortening of the other. Consequently, their retardations are additive, while their non-linearities are subtractive.

In the examples shown in U.S. Pat. No. 5,949,543 and U.S. Pat. No. 4,654,530 the axis of rotation of the rotatable refractive plate lies in the plane of the plate and is oriented essentially at a right angle to the light path that traverses the plate. As a different possibility of using a refractive plate as a scanner element in an interferometer, a transparent nutating disk is shown in U.S. Pat. No. 7,224,464. The refractive plate or disk in this case performs a wobbling movement, here referred to as nutation, which can be described as a rotation about a fixed axis that is oriented at acute angles both to the surface normal of the disk and to the direction of the light beam traversing the disk.

The foregoing arrangements of swiveling or nutating reflective and refractive scanner elements in interferometers according to the state of the art can be seen as attempts to avoid the difficulty of guiding the translatory movement of a single planar mirror with the required rectilinear (angular) precision which is in the microradian to arcsecond range, corresponding to an arc of about one to five millimeters at a distance of 1 kilometer. However, the fixed mutual alignment between the mirrors within a moving scanner assembly, i.e. in a periscope or a corner cube retro-reflector assembly, is also subject to substantially the same precision requirements. Another important consideration is that the optical throughput of an interferometer depends on the optical path length and on the size of the reflective and refractive components. Throughput is the product of solid angle and aperture area. As the beam paths get longer, e.g., due to folding, the divergence angle must be reduced to avoid clipping of the beam at the edges of the components, which reduces the solid angle and consequently the throughput for a given aperture. All other things being equal, the energy delivered to the detector element, and the resulting signal-to-noise-ratio performance are proportional to throughput. In many practical cases, system throughput is limited by the sampling interface, which allows the interferometer itself to be smaller and still provide matching throughput.

A scanning interferometer according to U.S. Pat. No. 5,066,990 has two roof reflectors (which could also be replaced by corner cube reflectors) that are solidly connected to the two arms of a pendulum with a fixed rotary axis which is arranged so that as one roof reflector moves away from the beam splitter of the interferometer, the other roof reflector moves towards the beam splitter, and vice versa. In an FT-IR spectrometer of this type which is commercially distributed by ABB Analytical Measurements (formerly Bomem), the fulcrum of the pendulum is formed by crossed flexures which define the rotary axis of the reciprocating swivel movement of the pendulum to interferometric precision.

A scanning mechanism that could be called complementary to the foregoing arrangement according to U.S. Pat. No. 5,066,990 can be found in U.S. Pat. No. 6,229,614 which shows two stationary retro reflectors solidly mounted on a chassis base in mutually perpendicular orientation. The stationary reflectors are flanking a movable beam splitter mounted on a swivel pendulum swinging about a stationary fulcrum axis formed by crossed flexures.

A scanner mechanism shown in U.S. Pat. No. 7,480,055 has two corner cube retro-reflectors mounted on two pendulums linked by a connecting brace. Analogous to the preceding example, as one retro-reflector moves away from the beam splitter of the interferometer, the other retro-reflector moves towards the beam splitter, and vice versa. A practical implementation of this kinematic concept of two linked pendulums, which is referred to as double-pivot scanning mechanism, is described and illustrated, wherein the entire mechanism, i.e. a stationary support carrying the beam splitter, the two pendulums and the connecting brace, the fulcrum flexures connecting the pendulums to the stationary support and the pivot flexures connecting the connecting brace to the pendulums, are formed monolithically of one piece of metal, using the process of electrical discharge machining (EDM), also referred to as spark erosion or wire erosion.

In an interferometer arrangement according to U.S. Pat. No. 5,675,412 the scanner element is a back-to-back double mirror, i.e. a planar-parallel plate with front and back reflector surfaces. The scanning motion is a reciprocating translatory linear movement of the double mirror perpendicular to the plane of reflection or by translation of a cube corner retroreflector. The two arms of the light path after the beam splitter are folded in such a way that they meet the double mirror from opposite directions. While one arm is reflected by the front surface, the other arm is reflected by the back surface and consequently, one arm is shortened while the other is lengthened, and vice versa, as a result of the reciprocating movement of the double mirror. The linear movement of the scanning element is said to be enabled by resiliently deflectable elements, which are not described in detail.

A flexure system designed to guide an optical element in linear translatory motion is described in U.S. Pat. No. 5,486,917. A plurality of monolithic flexure plates are assembled in pairs to provide a support system on which a retro-reflector is mounted for reciprocal linear motion. A flexure system of this kind could also be used to support the movable double mirror in the preceding interferometer arrangement according to U.S. Pat. No. 5,675,412.

In surveying the state of the art of interferometers, the applicants have observed that many existing approaches to supporting and moving the optical components, in particular the scan mechanism, provide insufficient protection against unwanted motions of the spectrometer components in the presence of extraneous disturbances including shock, vibration and temperature fluctuation. In addition, the applicants have found a need for new design concepts that would allow interferometers to be built in a more compact size and at a lower manufacturing cost than currently available state-of-the-art instruments, while meeting or exceeding their performance specifications.

Therefore, objects of the present invention include providing interferometers that are more stable against disturbances, more compact in size, and less expensive to build than state-of-the-art instruments while meeting or exceeding their levels of performance, including more rapid scanning ability and better photometric stability.

These objectives are met by an interferometer according to claim 1. Further developed embodiments and inventive details of the spectrometer are presented in the dependent claims.

An interferometer according to the invention has a body, at least one movable scanner assembly, and a motor serving to drive a reciprocating scanning movement of the scanner assembly relative to the body. Mounted on the body or in fixed relation to it are a radiation source, a collimator arrangement, a beam splitter, a folding mirror, a first terminal mirror, and a second terminal mirror. The movable scanner assembly includes a carrier part constrained with guided mobility relative to the body and a retro-reflector supported by the carrier part. The guiding constraint is preferably a pivotal connection that allows the movable scanner assembly to perform a swivel movement about a pivot axis, driven by the motor. The collimator arrangement serves to collect and redirect radiation originating from the radiation source into a collimated beam of substantially parallel rays which meets an optical surface of the beam splitter at a first oblique angle of incidence, where the incident beam is split into a first, reflected beam continuing along a first arm of the interferometer and a second, transmitted beam continuing along a second arm of the interferometer, and wherein the incident beam and a surface normal of the beam splitter together define a reference plane in a fixed position relative to the body.

Along the first, reflected arm of the interferometer, the scanner assembly is arranged with the retro-reflector positioned to intercept the first partial beam and fold it back to the first terminal mirror, the first partial beam meeting the first terminal mirror with essentially perfect normal incidence, such that the first partial beam is reflected exactly back through the same path along the first arm through the retro-reflector and from there back to the beam splitter, where the first partial beam is split into a first reflected portion returning to the collimator and a first transmitted portion continuing on an exit path of the interferometer.

Along the second, transmitted arm of the interferometer, the folding mirror is positioned to intercept the second partial beam at a second oblique angle of incidence and reflect it to the second terminal mirror, which is positioned to intercept and reflect the second partial beam with essentially perfect normal incidence and to thereby cause the beam in the second arm to exactly reverse its path back to the folding mirror, thence back to the beam splitter, where the returning second partial beam is split into a second transmitted portion returning to the collimator and a second reflected portion continuing on an exit path of the interferometer, The reciprocating movement of the scanner assembly including retro-reflector causes a corresponding variation of the optical path length of the first arm between the beam splitter and first terminal mirror, which results in a variable retardation $\delta$ of the first partial beam relative to the second partial beam at their recombination, so that optical interference between the first transmitted portion and the second reflected portion produces an exit beam of varying intensity, which is measured and recorded as the interferogram $I(\delta)$.

In accordance with the invention, the folding mirror and the second terminal mirror are positioned orthogonal to the reference plane and arranged on opposite sides of the exit path, so that the path of the second partial beam from the folding mirror to the second terminal mirror and back to the folding mirror lies in the reference plane and crosses the exit beam twice. This arrangement of the folding mirror and the second terminal mirror on opposite sides of the exit path is advantageous in that it allows a more compact geometry of the radiation path of the interferometer and the interferometer itself according to the invention, which significantly reduces the overall volume of the instrument, as the space traversed by the exit beam is at the same time also traversed twice by the second partial beam on its way to and from the second terminal mirror.

To function as an FT-IR spectrometer, the interferometer is equipped with a source, sampling interface, radiation detector and computing engine. A sampling interface can for example be a handheld probe or a sample container configured with an optical conduit such as an optical fiber cable to allow the exit beam of the interferometer to be conducted to the sample and then to the radiation detector. After reflection from the sample or transmission through the sample, or other interaction, the exit beam is conducted to the radiation detector, which can be mounted on the body of the interferometer and converts the radiation intensity of the exit beam into an electrical signal. Sampling interfaces and radiation detectors are well known in the art of FT-IR spectrometry and therefore will not be discussed further here.

In preferred embodiments of the invention, the first oblique angle of incidence is selected smaller than 45°, for example between 25° and 35°, and with particular preference at about 30° from the surface normal and lying in the reference plane.

The movable scanner assembly can have any position and orientation that allows the retroreflector to intercept the first arm, whose section between the beam splitter and the retroreflector lies in the plane of reference, and fold the beam and arm to the terminal mirror. In a preferred arrangement, the pivot axis of the movable scanner is located in a plane that extends orthogonal to the first arm. As is evident, this also includes an orientation of the pivot axis perpendicular to the reference plane.

The scanner assembly can be arranged so that the first partial beam, after interception by the retro-reflector, is folded back to the first terminal mirror along a fold-back path that lies in the reference plane. However, in a preferred arrangement of the scanner assembly, the first partial beam, after interception by the retro-reflector, is folded out of the reference plane and back to the first terminal mirror along a fold-back path that extends parallel to, and at a distance above or below the reference plane.

In preferred embodiments of the invention, the second oblique angle of incidence is selected smaller than 45°, for example between 25° and 35°, and with particular preference at about 30° from the surface normal.

According to a preferred embodiment of the invention, the optical elements of the interferometer further include a compensator plate which is placed in the second arm of the radiation path between the beam splitter and the second terminal mirror. The compensator plate may be placed either before or after the folding mirror. Its function is to ensure that light traveling through either arm of the interferometer encounters the same thickness of refractive material and, more particularly, to equalize dispersion. As mentioned previously and also illustrated in FIG. 1, in a conventional arrangement the beam splitter and a compensator plate of matched thickness and matched wedge angle are placed close together. The inventive placement of the compensator plate in the second arm of the radiation path between the beam splitter and the second terminal mirror has the advantage that the first and second arm of the radiation path each include only three traverses through the glass thickness of the beam splitter substrate or the compensator plate, while the conventional arrangement of the comparator plate entails four traverses for each arm through the glass thickness of either the beam splitter substrate or the compensator plate. Consequently, the inventive arrangement of the compensator plate in the second arm of the radiation path between the beam splitter and the second terminal mirror advantageously reduces the reflection and transmission losses associated with the beam splitter and compensator function. It is rare for infrared beam splitter substrates to literally be made of glass, so the description of the typically crystalline beam splitter substrate material and compensator as glass should be understood as figurative, a literary convenience, rather than literal.

In a preferred embodiment of the invention, the collimator includes a first reflector shaped as a partial ellipsoid of revolution with a first focal point and a second focal point, and a second reflector shaped as a partial paraboloid of revolution with a third focal point that is coincident with the second focal point. The ellipsoidal mirror may be substituted by two parabolic mirrors, to some advantage, but the function remains essentially the same, reimaging a portion of the source element to an aperture that controls the divergence angle of infrared radiation entering the interferometer. The radiation source and the first reflector are arranged so that the source is located nominally in the first focal point. An aperture, often called a Jacquinot stop or J-stop, is arranged at the second focal point. This arrangement has the effect of efficiently transferring infrared radiation from the source to the aperture, while minimizing conducted heat. The second reflector is arranged so that the central axis of the paraboloid is oriented parallel to the reference plane and the third focal point is located in the J-stop aperture and thus substantially coincides with the second focal point. As a result of this arrangement, radiation originating from the source leaves the second reflector as a well-collimated beam having a well-defined divergence angle propagating parallel to the reference plane.

The pivotal connection of the movable scanner assembly to the body is preferably configured as an arrangement of leaf springs, generally referred to as flexures or flex-pivots, which allow a precise and inherently stiction-free and play-free rotary connection. Typically, the relative rotary movement between the connected parts is a reciprocating swivel movement of limited amplitude. With particular preference, the movable scanner assembly is connected to the body through a pair of spaced-apart cross-flexure pivots which define the pivot axis of the scanner assembly. The flexures are comparatively stiff in all other potential axes of motion.

The motor driving the reciprocating movement of the scanner assembly is preferably configured as a linear motor of the kind used in loudspeakers, wherein a cylindrical coil is arranged in a corresponding cylindrical gap of a permanent magnet assembly which includes a permanent magnet with one or more pole pieces of high-permeability material, often soft iron, serving to channel the magnetic flux. However, unlike the customary arrangement of a loudspeaker, the drive coil in the interferometer of the invention is installed in a stationary position on the body, while the permanent magnet is rigidly attached to the scanner assembly. As a preferred feature of the invention, the mass distribution of the scanner assembly with the retro-reflector and the permanent magnet is balanced relative to the pivotal axis of the reciprocating swivel movement of the scanner assembly. In essence, the mass of the permanent magnet and pole pieces thus serve to counterbalance the mass of the retro-reflector. This has the effect of substantially immunizing the interferometer against velocity variations caused by linear and torsional vibrations in all axes other than the single rotary scan axis.

The interferometer according to the invention further includes a reference source, which provides internal wavelength calibration. In the preferred embodiment, the reference source is installed in the area of the incident infrared beam upstream of the beam splitter, and a laser detector element is installed on the body in the area of the recombined beam downstream of the beam splitter. The reference source is positioned and aimed to emit a beam parallel to the incident IR beam, falling on an area of the beam splitter with a suitable coating for the reference wavelength. Analogous to the light of the other source, the incident beam is likewise split into two paths traversing the two arms, and the recombined beam is received by a detector. The resulting reference signal is processed according to methods well known in the art.

In preferred embodiments of the invention, the reference source is a diode laser arranged behind the paraboloid-shaped source-collimating mirror, with its beam aimed through an opening in said mirror, while the laser detector is arranged on a portion of the body near the exit of the interferometer, which leads to the sampling interface. The diode laser is equally effective if it propagates in the reverse direction through the system, with the detector mounted where the laser is, and vice versa.

BRIEF DESCRIPTION OF THE DRAWINGS

The interferometer according to the invention will be described hereinafter through embodiments shown schematically in the drawings, wherein.

DETAILED DESCRIPTION OF THE EXEMPLARY EMBODIMENTS

Figure 1:
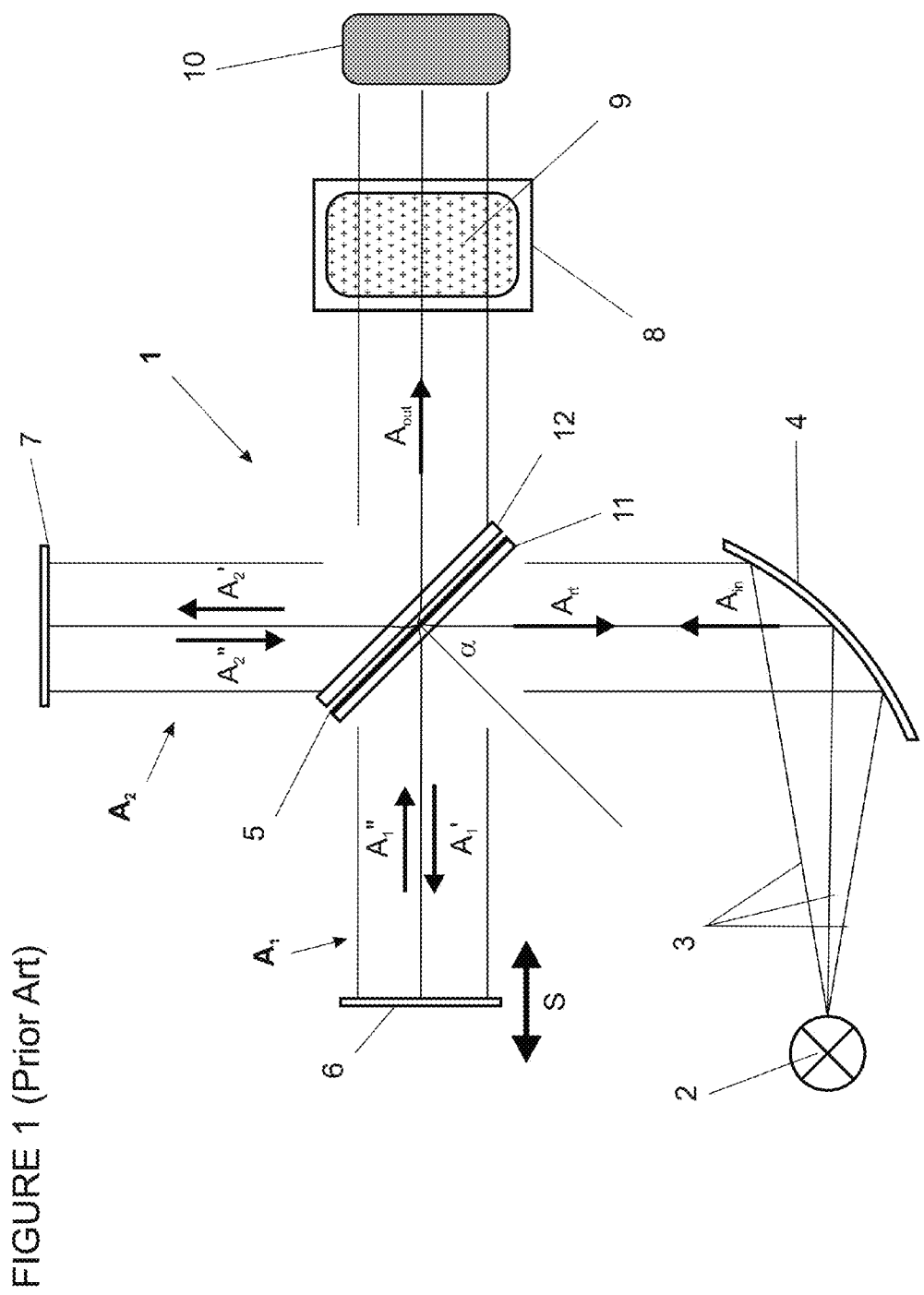
FIG. 1 illustrates the principle of a scanning interferometer.

A scanning Michelson interferometer 1 as illustrated schematically in FIG. 1 includes a beam splitter 5 with a beam splitter coating 11, a compensator plate 12, a moving mirror 6 terminating a first arm $A_1$ of the interferometer 1, and a fixed mirror 7 terminating a second arm $A_2$ of the interferometer 1. The reciprocating scanning movement of the mirror 6 which causes a periodic variation in the length of the first arm $A_1$ is indicated by the double arrow S. Radiation 3 from a source 2 is collimated by a collimating mirror 4 and directed to the beam splitter 5, which is positioned to receive the collimated incoming radiation $A_{in}$ at an angle of incidence $\alpha$ of 45°. The beam splitter 5 divides the incoming radiation $A_{in}$ into two partial beams propagating along the two arms $A_1$ and $A_2$, i.e. a first, reflected partial beam $A_1'$ and a second, transmitted partial beam $A_2'$ which propagate in directions 90° apart from each other to the two mirrors 6 and 7, respectively, where they are reflected as $A_1''$ and $A_2''$ and return along the same paths to the beam splitter 5. Each of the two returning partial beams $A_1''$ and $A_2''$ is again divided by the beam splitter 5 into a reflected portion and a transmitted portion. At the same time, the transmitted portion of $A_1''$ and the reflected portion of $A_2''$ are recombined in the exit beam $A_{out}$, while the reflected portion of $A_1''$ and the transmitted portion of $A_2''$ are recombined in the returning beam $A_{rt}$ which travels along the same path as the incoming beam $A_{in}$, but in the opposite direction. The radiation path of the interferometer 1 with the incoming beam $A_{in}$, the two arms $A_1$ and $A_2$ and the exit beam $A_{out}$ lies in the plane of incidence of the incoming radiation $A_{in}$, i.e. the reference plane defined hereinabove which contains the surface normal of the beam splitter 5 and the propagation vector $A_{in}$.

The function of the compensator plate 12 is best understood by counting the number of times the radiation path traverses the thickness of either the glass substrate of the beam splitter 5 or the equal thickness of the compensator plate 12. The radiation coming from the source makes a first traverse of one glass plate thickness through the glass substrate of the beam splitter 5. After reflection at the beam splitter coating 11, the continuing first partial beam $A_1'$ makes a second traverse through the beam splitter substrate, the returning first partial beam $A_1''$ makes a third traverse through the beam splitter substrate, and the recombined outgoing beam $A_{out}$ completes a fourth traverse of one glass plate thickness through the compensator plate. At the same time, after the first traverse of the incoming beam $A_{in}$ through the beam splitter substrate and transmission through the beam splitter coating 11, the continuing second partial beam $A_2'$, the returning second partial beam $A_2''$, and the recombined outgoing beam $A_{out}$ make, respectively, a second, third, and fourth traverse of one glass plate thickness through the compensator plate.

The phase difference between the returning partial beams $A_1''$ and $A_2''$ at their recombination into the exit beam $A_{out}$ is dependent on the difference $\delta$ between the respective path lengths travelled by $A_1'$, $A_1''$ and $A_2'$, $A_2''$ between the beam splitter 5 and the terminal mirrors 6, 7 as well as on the wavelength of the radiation. As described previously herein, due to the optical interference between $A_1''$ and $A_2''$ at their recombination, the intensity of the recombined beam $A_{out}$ varies as a function of the difference $\delta$ (commonly referred to as retardation $\delta$) between the variable path length travelled by $A_1'$, $A_1''$ and the fixed path length travelled by $A_2'$, $A_2''$. In interferometric spectrometry (FT-IR spectrometry), the exit beam $A_{out}$ generally passes through (or is interacted with) a sample 9 in a sample container 8 and subsequently focused on an electro-optical sensor 10 which produces an electrical signal representing the light intensity I of the recombined beam $A_{out}$ as a function of the retardation $\delta$, which is referred to as interferogram $I(\delta)$.

Figure 2:
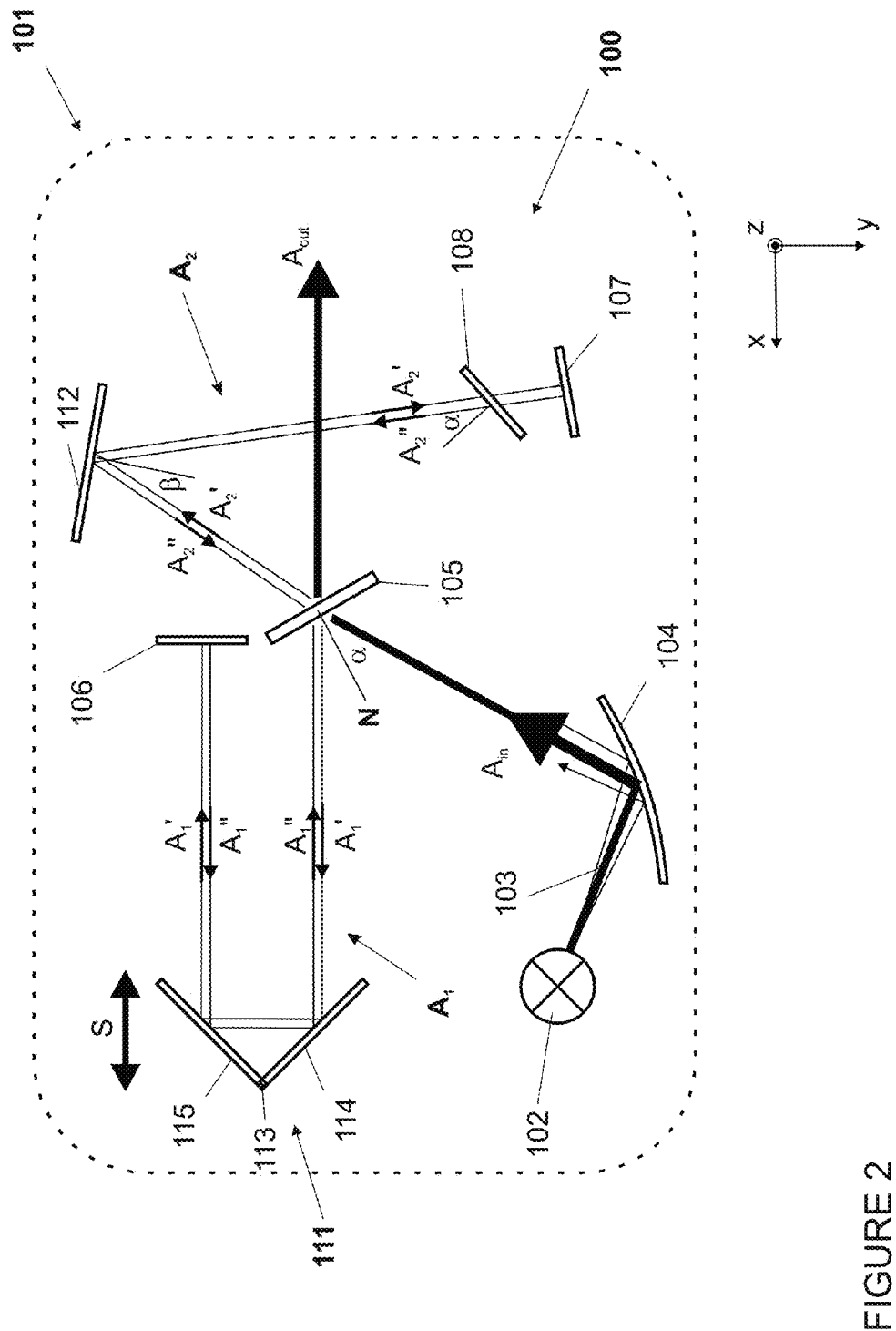
FIG. 2 illustrates a scanning interferometer according to a first embodiment of the invention.

FIG. 2 schematically illustrates the conceptual layout of a scanning interferometer 101 in accordance with the present invention, whose components are mounted on a supporting structure 100, referred to herein as the body 100. As in FIG. 1, radiation 103 from a source 102 is collimated by a parabolic mirror 104 and directed to the beam splitter 105, which splits the incoming beam $A_{in}$ into the two arms $A_1$ and $A_2$. Likewise, analogous to FIG. 1, the drawing plane coincides with the plane of incidence of the incoming radiation $A_{in}$, i.e. the plane which contains the surface normal of the beam splitter 105, the propagation vector $A_{in}$ and the surface normals of mirrors 106, 107 and 112. However, in contrast to FIG. 1, the incoming beam $A_{in}$ meets the beam splitter 105 at an angle of incidence $\alpha<45°$, so that the incoming beam $A_{in}$ and reflected partial beam $A_1'$ enclose an angle of less than 90°.

Along the first arm $A_1$ of the interferometer 101, the scanner assembly with the retro-reflector 111 is arranged to intercept the first partial beam $A_1'$ and fold it onto a parallel path to the first terminal mirror 106. The first partial beam $A_1'$ meets the first terminal mirror 106 with essentially perfect normal incidence, so that the returning first partial beam $A_1''$ travels the exact same path as $A_1'$ in the opposite direction back to the retro-reflector 111 and from there to the beam splitter 105, where the returning first partial beam $A_1''$ is split into a first reflected portion returning to the collimator and a first transmitted portion continuing on an exit path of the interferometer.

The retro-reflector 111 in the first arm $A_1$ of the interferometer 101 is schematically represented as a roof reflector, i.e. two mirrors 114, 115 joined along a ridge 113 and set at a 90° angle to each other. As the two mirror surfaces of the roof reflector 111 in FIG. 2 are oriented perpendicular to the drawing plane (which coincides with the aforementioned plane of incidence of $A_{in}$), the folded segments of the radiation path $A_1'$, $A_1''$ remain in the same plane. As a result, the output beam also lies in the same plane, so the folded arm must reach a terminal mirror lying in the same plane. For this embodiment, it is critical that the pivot axis be exactly normal to the plane containing the surface normal of mirrors 106, 107 and 112. In a preferred alternative embodiment, the retro-reflector is a corner-cube reflector, in which three mirror surfaces are joined together like the sides of a cube. The use of corner-cube reflectors maintains high-quality interferometric alignment even when the flexures have undesired deviations. A roof reflector also may be used to fold the beam up to a terminal mirror, but then a different pivot axis is required, one that is parallel to the reference plane containing the aforementioned surface normals.

Along the second arm $A_2$ of the interferometer 101, the folding mirror 112 is positioned to intercept the second partial beam $A_2'$ at a second angle of incidence 13 and reflect it to the second terminal mirror 107, which is positioned to intercept and reflect the second partial beam $A_2'$. It is essential that the beam arrive at terminal mirror 107 with perfect normal incidence and to thereby cause the returning second partial beam $A_2''$ to travel along the same path as $A_2'$ in the opposite direction back to the folding mirror 112 and from there to the beam splitter 105, where the returning second partial beam $A_2''$ is split into a second transmitted portion returning to the collimator and a second reflected portion continuing on an exit path $A_{out}$ of the interferometer. As the mirror surface of the folding mirror 112 is further oriented perpendicular to the drawing plane of FIG. 2, which coincides with the aforementioned plane of incidence of $A_{in}$, the folded segments of the radiation path $A_2'$, $A_2''$ remain in the same plane.

As described above for the interferometer 1, the portion of $A_1''$ that is transmitted and the portion of $A_2''$ that is reflected by the beam splitter 105 are recombined in the exit beam $A_{out}$, while the transmitted portion of $A_2''$ and the reflected portion of $A_1''$ are recombined in the returning beam $A_{rt}$ which travels along the same path as the incoming beam $A_{in}$, but in the opposite direction. Also, as described previously herein, optical interference occurs between the recombined beam portions, so that an interferogram $I(\delta)$ can be registered by an optical sensor, also referred to as radiation detector (not shown in FIG. 2).

Further in contrast to FIG. 1, the compensator plate 108 in the embodiment of FIG. 2 is placed in the second arm $A_2$ of the radiation path between the folding mirror 112 and the terminal mirror 107. Following the radiation path on the one hand along the segments $A_{in}$, $A_1'$, $A_1''$, $A_{out}$, and on the other hand along the segments $A_{in}$, $A_2'$, $A_2''$, $A_{out}$, one finds that, either way, the radiation passes through only three glass plate thicknesses. The resultant advantageous reduction in transmission and reflection losses in comparison to the conventional compensator arrangement of FIG. 1 has been discussed previously herein.

The two-dimensional schematic layout of the interferometer 101 of FIG. 2 illustrates three essential features through which the invention meets its primary objective of a compact design:

1) the light source, the collimator and the beam splitter are arranged in such a way that the incoming radiation beam $A_{in}$ meets the beam splitter surface at an angle of incidence α that is significantly smaller than 45°, for example 30° or less;
2) the first, scanning arm $A_1$ is parallel-folded with a retroreflector used as scanner, such as a trihedral (corner-cube) or dihedral (roof-shaped) reflector; and
3) the second, fixed arm $A_2$ is folded by a folding mirror that directs the reflected beam across a space that is also simultaneously traversed by the exit beam $A_{out}$ of the interferometer.

Figure 3:
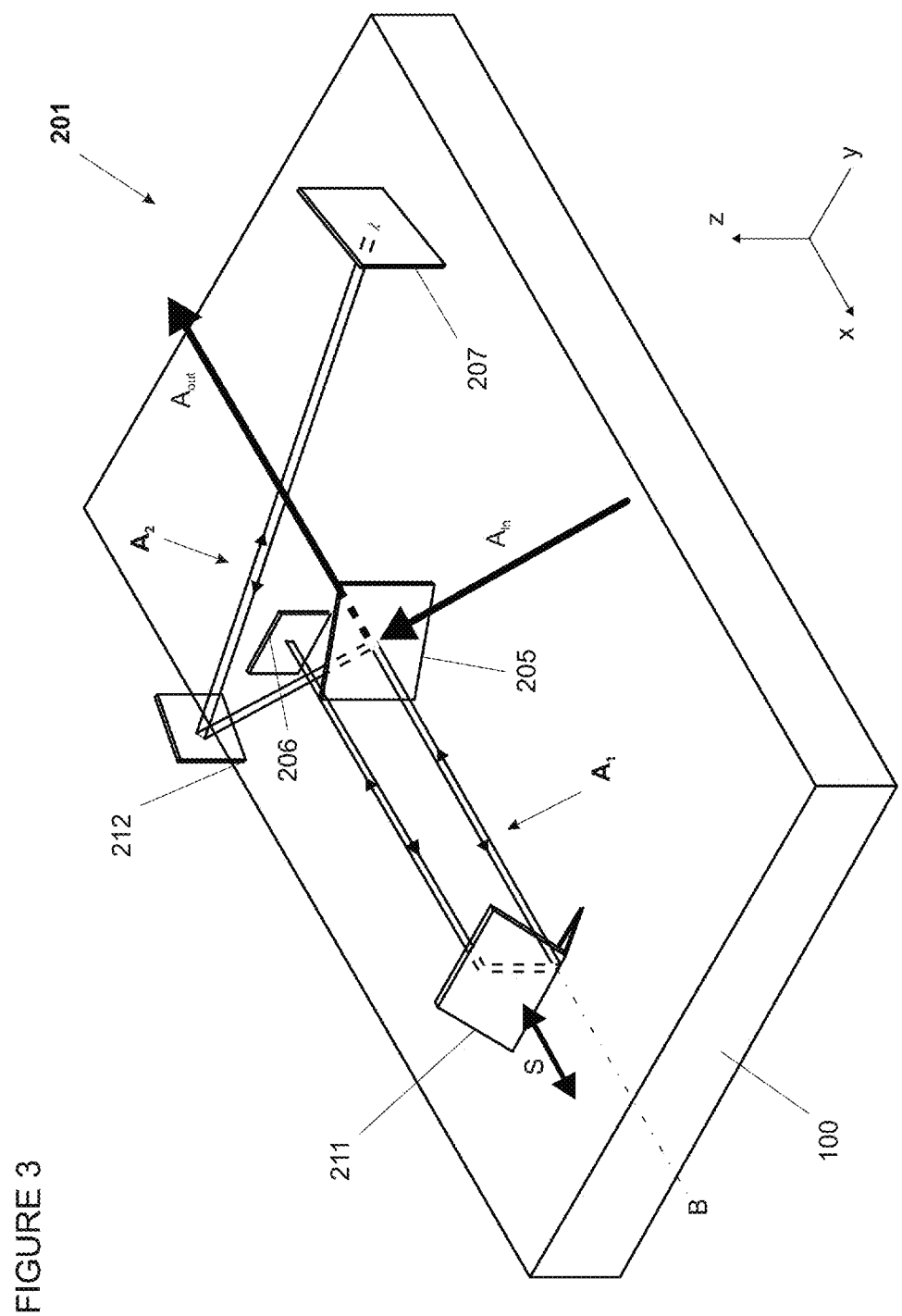
FIG. 3 illustrates a scanning interferometer according to a second embodiment of the invention in a perspective view.

The interferometer 201 in FIG. 3 differs from the embodiment of FIG. 2 in that the first arm $A_1$ of the radiation path in FIG. 3 is folded back into a parallel plane which in the perspective drawing of FIG. 3 extends vertically above the plane of incidence of $A_{in}$. This folding of the first arm $A_1$ is achieved by flipping the roof reflector 111 of FIG. 2 by 90° about the axis B of the beam segment $A_1'$ arriving from the beam splitter 205. Analogous to the arrangement of FIG. 2, the folded-back beam $A_1'$ is intercepted and reflected by an appropriately positioned terminal mirror 206.

The roof reflector 211 could be tilted at any angle (not limited to 90°) about the axis B of the incident beam path. The general requirements for the positioning of a roof reflector to perform its function of folding an incoming beam into a parallel outgoing beam are that the ridge line needs to be perpendicular to the incoming radiation path and the two intersecting mirror surfaces need to enclose a right angle. This relationship must be maintained to interferometric precision. Placement of the scanner pivot axis and motion quality is much more forgiving with a hollow cube corner retroreflector than the roof reflector, because of the more complete tilt compensation.

The reciprocating movement of the retroreflector which is symbolized by the double arrow S in FIGS. 2 and 3 can be a translatory movement where the retroreflector 111, 211 is guided for example by a slide track or by a so-called porch-swing mechanism. However, in a preferred arrangement according to FIG. 4, the retroreflector 311, which is shown here symbolically as a roof reflector but could also be configured as a corner cube reflector, is part of a scanner assembly 320 which is guided by a cross-flexure pivot 321 in a rotary swivel movement symbolized by the rotary double arrow R. The axis C of the reciprocating rotary movement R is oriented at a right angle to the drawing plane of FIG. 4 and (for small amplitudes of the reciprocating swivel movement) essentially coincides with the intersection of the flexure leaf springs of the pivot 321. The reciprocating swivel movement of the scanner assembly 320 comprising a carrier part 325 is driven by a motor 322 which includes a stationary coil 323 attached to the body of the interferometer and a permanent magnet assembly 324 attached to the scanner assembly 320.

In the swiveling scanner assembly 320, the permanent magnet assembly 324 can be arranged so that its mass almost exactly counterbalances the mass of the retroreflector 311. In other words, the combined center of gravity of the scanner assembly lies on the rotary axis C of the swivel movement R. This mass-balancing of the scanner assembly largely immunizes the interferometer against the effects of acceleration, position changes, shocks and vibrations.

Figure 4:
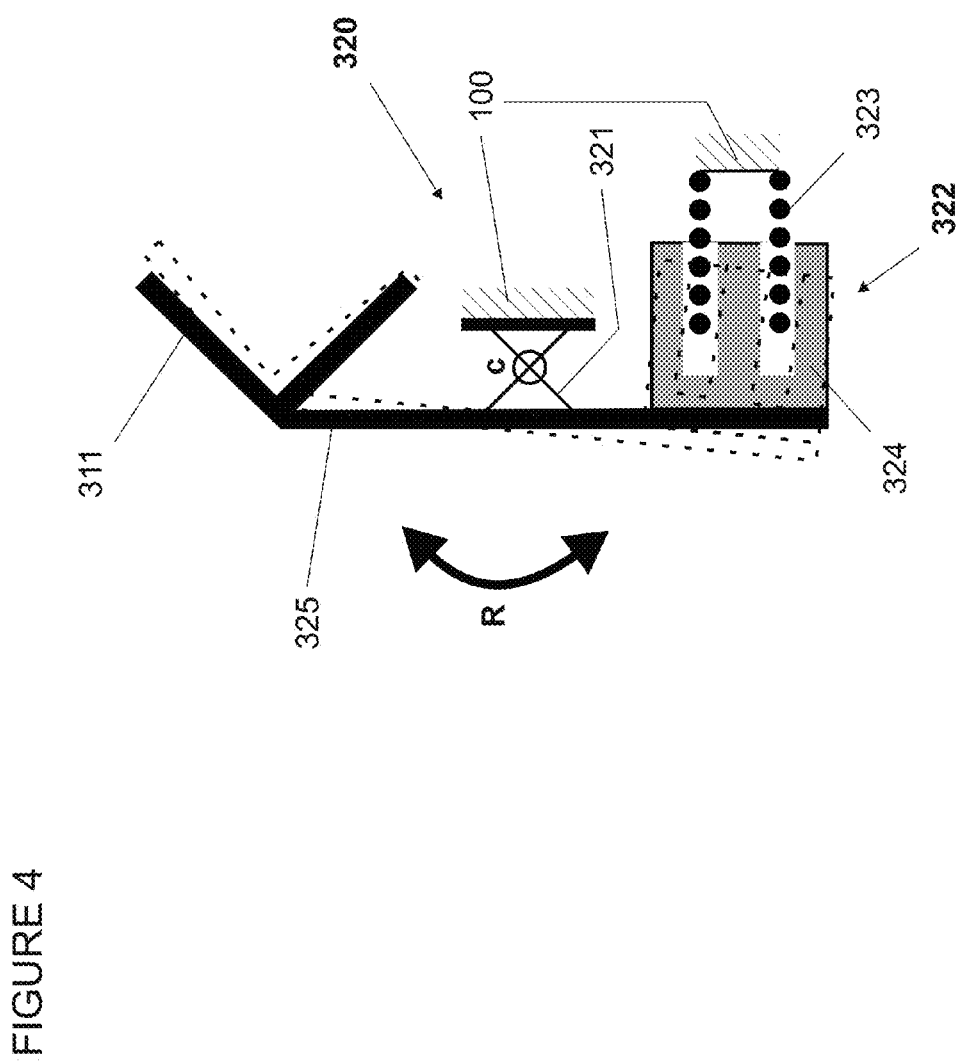
FIG. 4 illustrates the scanner assembly of an interferometer according to the invention.

According to the invention, an interferometer of the general configuration illustrated in FIGS. 2 and 3 is preferably equipped with the mass-balanced, swivel-pivoted scanner assembly 320 of FIG. 4. If the retroreflector 311 is a roof reflector (as illustrated in the drawings), the line of intersection of the two mirror surfaces has to be exactly parallel to the rotary axis C of the swivel movement R, and the axis C has to be orthogonal to the incident beam of radiation $A_1'$ and to the surface normals of mirrors 106, 107, 112 in FIG. 2 or 206, 207, 212 in FIG. 3. If the retroreflector 311 is a corner-cube reflector, on the other hand, it will work in any orientation as long as its trihedral concavity catches the incident beam and directs the reflected beam $A_1'$ to the terminal mirror 106, 206.

While the invention has been described through the presentation of several specific embodiments, it is considered self-evident that numerous additional variants are encompassed by the teachings of the present invention, for example by combining the features of the individual embodiments with each other and/or by exchanging individual functional units of the embodiments against each other, and that such combinations are included in the scope of the invention.

The invention claimed is:

1. An Interferometer, comprising:
a body supporting stationary parts of the interferometer, a movable scanner assembly, and a motor;
said stationary parts comprising a radiation source, a collimator arrangement, a beam splitter, a folding mirror, a first terminal mirror, and a second terminal mirror;
said movable scanner assembly comprising a carrier part drivable by the motor in reciprocating guided movement relative to the body; and
a retro-reflector supported by the carrier part;
wherein, radiation originating from the radiation source and collimated into a beam of substantially parallel rays will meet an optical surface of the beam splitter at a first oblique angle of incidence to form an incident beam;
wherein the incident beam will be split into a first, reflected partial beam that will continue along a first arm of the interferometer and a second, transmitted partial beam that will continue along a second arm of the interferometer;
wherein the incident beam and a surface normal of the beam splitter define a reference plane;
wherein along the first arm, the scanner assembly is arranged with the retro-reflector positioned to intercept the first partial beam and fold it towards the first terminal mirror such that the first partial beam will meet and be reflected by the first terminal mirror with substantially perfect normal incidence, and the reflected first partial beam will return through the same path along the first arm to the retro-reflector and from there to the beam splitter, where the returning first partial beam will be split into a first reflected portion returning to the collimator and a first transmitted portion continuing on an exit path;
wherein along the second arm, the folding mirror is positioned to intercept the second partial beam at a second oblique angle of incidence and reflect it to the second terminal mirror, which is positioned to intercept and reflect the second partial beam with substantially perfect normal incidence, such that the reflected second partial beam will return through the same path along the second arm to the folding mirror and from there to the beam splitter, where the returning second partial beam will be split into a second transmitted portion returning to the collimator and a second reflected portion continuing on the exit path; and
wherein the folding mirror and the second terminal mirror are positioned orthogonal to the reference plane and on opposite sides of the exit path, so that a section of the second partial beam from the folding mirror to the second terminal mirror and back to the folding mirror lies in the reference plane and will cross the exit beam twice.

2. The interferometer of claim 1, wherein reciprocating movement of the scanner assembly with the retro-reflector will cause a corresponding variation of the optical path length of the first partial beam between its departure from and return to the beam splitter, which will result in a variable retardation of the first partial beam relative to the second partial beam at their recombination, so that optical interference therebetween will produce an exit beam of varying intensity, which is measurable and recordable as an interferogram.

3. The interferometer of claim 1, wherein the retro-reflector is selected from the group consisting of roof reflectors and corner-cube reflectors.

4. The interferometer of claim 1, wherein the first oblique angle of incidence is between 25° and 35° from the surface normal.

5. The interferometer of claim 1, wherein the reciprocating guided movement of the scanner assembly is a rotary swivel movement about a pivot axis thereof.

6. The interferometer of claim 5, wherein the pivot axis of the movable scanner assembly is located in a plane that extends orthogonal to the first arm.

7. The interferometer of claim 5, wherein the pivot axis is oriented perpendicular to the reference plane.

8. The interferometer of claim 5, wherein the first partial beam, after interception by the retro-reflector, will be folded back to the first terminal mirror along a fold-back path that lies in the reference plane.

9. The interferometer of claim 5, wherein the first partial beam, after interception by the retro-reflector, will be folded out of the reference plane and back to the first terminal mirror along a fold-back path that extends parallel to, and at a distance from, the reference plane.

10. The interferometer of claim 5, wherein a swivel pivot of the movable scanner assembly is configured as an arrangement of crossed flexures defining the pivot axis of the scanner assembly.

11. The interferometer of claim 10, wherein the arrangement of crossed flexures comprises a pair of spaced-apart cross-flexure pivots.

12. The interferometer of claim 1, wherein the second oblique angle of incidence is between 25° and 35° from a surface normal of the folding mirror.

13. The interferometer of claim 1, further comprising a compensator plate located in the second arm of the radiation path between the beam splitter and the second terminal mirror.

14. The interferometer of claim 1, wherein the motor comprises a permanent magnet assembly and a cylindrical coil arranged in a cylindrical gap of the magnet assembly, wherein the coil is installed in a stationary position on the body, while the permanent magnet assembly is attached to the movable scanner assembly.

15. The interferometer of claim 14, wherein the scanner assembly with the retro-reflector and the permanent magnet assembly is balanced relative to a pivot axis of the scanner assembly, so that the mass of the permanent magnet assembly substantially counterbalances the mass of the retroreflector.

16. The interferometer of claim 2, further comprising:
a reference source located in the area of the incident beam upstream of the beam splitter; and
a laser detector installed on the body in the area of the recombined exit beam downstream of the beam splitter;
wherein the reference source is positioned and aimed to emit a reference beam parallel to the incident beam such that the reference beam will fall on an area of the beam splitter having a suitable coating for the reference wavelength, where the reference beam will be split into two arms, analogous to the incident beam, and the recombined reference beam will be received by the laser detector.

17. The interferometer of claim 16, wherein the reference source is a diode laser arranged behind a paraboloid-shaped second reflector with the reference beam aimed through an opening in the second reflector, while the laser detector is arranged in the area of a sampling interface.

18. The interferometer of claim 16, wherein the reference source is a diode laser arranged in the area of a sampling interface, while the laser detector is arranged behind a paraboloid-shaped second reflector so as to receive the reference beam through an opening in the second reflector.

* * * * *